United States Patent [19]

Marrelli

[11] Patent Number: 4,555,310
[45] Date of Patent: * Nov. 26, 1985

[54] METHOD OF UTILIZING ENERGY OF HIGH PRESSURE CONDENSATE

[75] Inventor: Ronald E. Marrelli, Bountiful, Utah

[73] Assignee: Phillips Petroleum Company, Bartlesville, Okla.

[*] Notice: The portion of the term of this patent subsequent to Jan. 26, 2000 has been disclaimed.

[21] Appl. No.: 938,189

[22] Filed: Aug. 30, 1978

[51] Int. Cl.$^4$ ............................................. B01D 3/38
[52] U.S. Cl. ........................................ 203/10; 203/21; 203/96; 203/99; 203/DIG. 8; 203/DIG. 16; 159/DIG. 22; 122/451 R; 122/451 S; 208/253; 208/284; 261/DIG. 46
[58] Field of Search ............ 208/253, 251 R, 284–288, 208/353, 348, 354, 362, 356, 363, 365, 368; 203/92, 93, 88, 95–97, 10, 11, 21, 99, DIG. 8, 25, 26, 27, DIG. 16; 159/DIG. 22; 261/DIG. 46; 122/451 R, 451 S

[56] References Cited

U.S. PATENT DOCUMENTS

| | | | |
|---|---|---|---|
| 2,025,724 | 12/1935 | Clendenin | 203/88 |
| 2,042,713 | 6/1936 | Gray | 203/92 |
| 2,325,839 | 8/1943 | Eastman et al. | 208/348 |
| 2,377,736 | 6/1945 | White | 203/27 |
| 2,684,933 | 7/1954 | Findlay | 208/356 |
| 2,787,586 | 4/1957 | Catterall | 203/93 |
| 2,930,753 | 3/1960 | McMahon | 208/208 |
| 3,471,371 | 10/1969 | Nagy et al. | 203/98 |
| 3,494,861 | 2/1970 | Munro | 203/27 |
| 3,518,056 | 6/1970 | Klett | 203/93 |
| 3,711,544 | 1/1973 | Summerville | 203/88 |
| 3,962,404 | 6/1976 | Giammarco et al. | 203/96 |
| 4,014,782 | 3/1977 | Armas | 208/363 |
| 4,149,940 | 4/1979 | Pinto | 203/DIG. 8 |

FOREIGN PATENT DOCUMENTS 25806 2/1977 Japan .................................. 208/348

Primary Examiner—Wilbur Bascomb
Attorney, Agent, or Firm—C. F. Steininger

[57] ABSTRACT

A method of utilizing the energy of a high pressure condensate stream including passing steam at an elevated pressure in indirect heat exchange with a material to be heated, collecting a condensate product condensed from the steam of the heat exchange step at an elevated pressure, passing the condensate directly to a steam stripping step at essentially the same pressure at which the condensate was collected and reducing the pressure of the condensate while simultaneously contacting the condensate with a material to be stripped in the stripping step.

13 Claims, 3 Drawing Figures

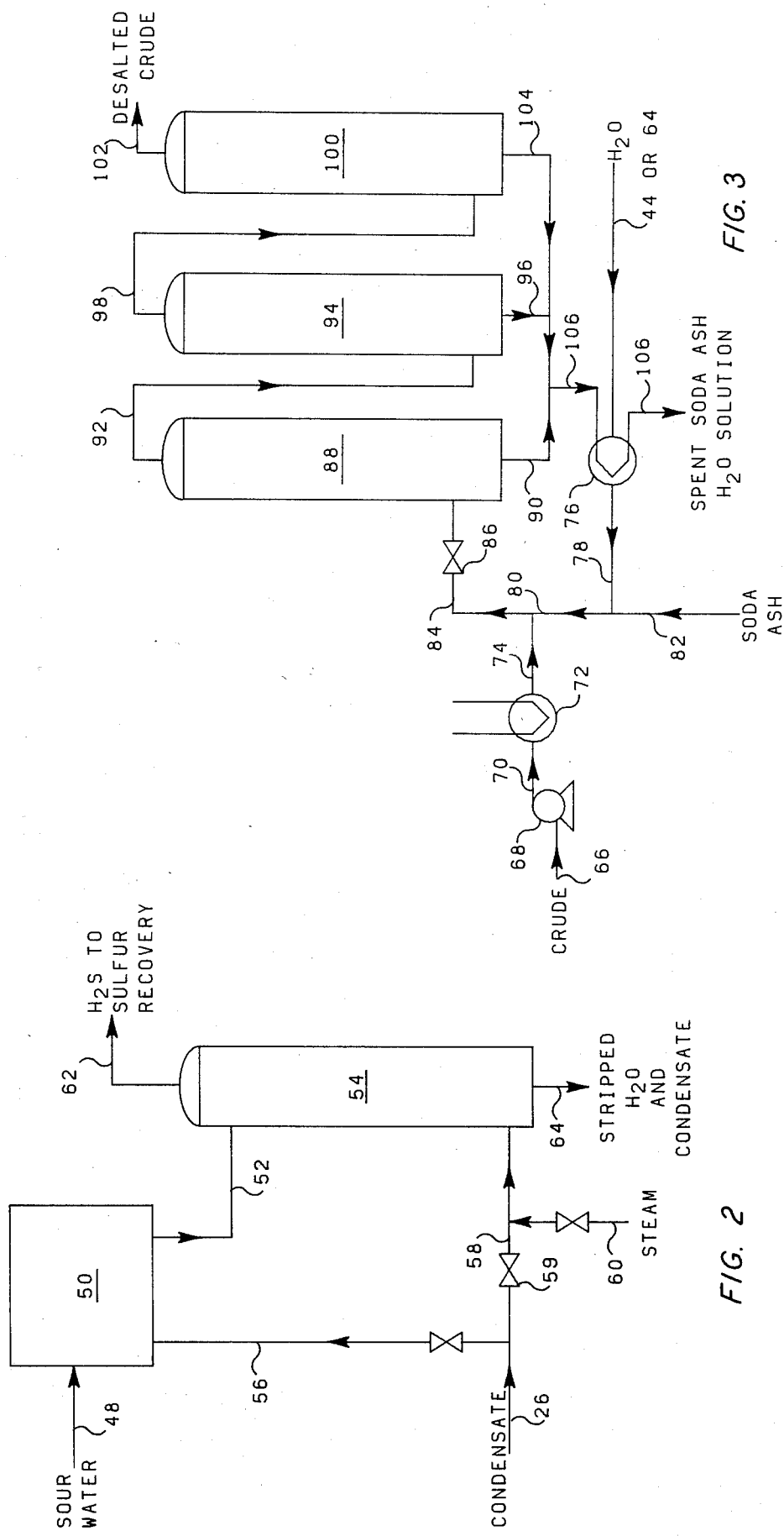

METHOD OF UTILIZING ENERGY OF HIGH PRESSURE CONDENSATE

BACKGROUND OF THE INVENTION

The present invention relates to a method of conserving energy. In a more specific aspect the present invention relates to a method of utilizing the energy of a high pressure steam condensate. In yet another aspect, the present invention relates to a method of utilizing the energy of a high pressure steam condensate, from a heat exchange operation utilizing the steam as an indirect heating medium, to supply at least part of the energy necessary for a steam stripping operation.

Due to the rapidly dwindling supply of fossil fuels it is necessary that extended efforts be made to conserve energy where at all possible. This is particularly true in industrial operations. In light of this need, workers in the chemical and petroleum industries have recently extended great effort and have successfully reduced energy requirements and thus conserved fossil fuels in many operations. The present invention relates to one such energy conservation technique.

In numerous industrial operations, for example the separation of various multicomponent chemical streams by fractionation, evaporation and other well known techniques, steam at an elevated pressure is often utilized as a heating medium in indirect heat exchange with the material being separated. For example, in a fractionation column, such as a fractionation column for separating crude oils and products thereof into various desired products, material being fractionated is withdrawn from the bottom of the fractionating column, passed through a reboiler and back to a higher point adjacent the bottom of the column. In many cases, such a reboiler is heated by passing steam at an elevated pressure into the reboiler and collecting a high pressure condensate, at essentially the same pressure as the steam feed, from the reboiler. Normally, the high pressure condensate is then passed to a flash drum, to drop the pressure, and water under essentially atmospheric pressure and of substantially reduced temperature is either discarded or utilized in other operations where water is needed, depending upon the purity or quality of the water. This obviously is a waste of the energy represented by both the pressure and temperature of the high pressure condensate.

In still other industrial operations, constituents of relatively low boiling point are stripped from multicomponent liquids by countercurrent contact with a vapor. The most commonly used stripping medium in such cases, is low pressure steam. For example, in refinery operations steam is used as a stripping medium to remove hydrogen sulfide from sour water streams, in dephlegmators to strip light hydrocarbons from rich absorption oil, in solvent refining operations to remove traces of solvent from product streams, in deasphalting, dewaxing and deoiling of petroleum products, to strip various products and in numerous other such refining operations. Such operations obviously utilize substantial volumes of steam and accordingly substantial amounts of fuel to generate this steam.

As previously implied, there are also numerous operations in industrial operations which require substantial volumes of water. This is particularly true of waters of low mineral content. For example, in the petroleum industry, crude oil desalting operations require substantial volumes of fresh water, preferably of low mineral content, various boilers and cooling towers also require water, as well as various other operations. In many such cases, it is impossible to use process waste waters, which are contaminated with various chemicals and oils. However, it would be highly desirable if water, which has been used for various purposes and is in a relatively pure state, could be reused in other operations.

It is therefore an object of the present invention to provide an improved technique for conserving energy in industrial processes. Another object of the present invention is to provide an improved technique for conserving energy in petroleum refining operations. In yet another aspect the present invention relates to an improved technique for utilizing the energy of a high pressure steam condensate. Yet another object is to provide an improved technique for utilizing the energy of a high pressure steam condensate to supply the energy necessary for steam stripping various multicomponent materials. Another and further object of the present invention is to provide an improved technique for utilizing the energy of high pressure steam condensate to supply a substantial portion of the energy necessary for the steam stripping of multicomponent streams and to thereafter utilize recovered low pressure condensate for use in still other operations requiring substantial volumes of water.

These and other objects of the present invention will be apparent to one skilled in the art from the following description of the invention.

SUMMARY OF THE INVENTION

The present invention relates to a method of utilizing the energy of a high pressure steam condensate, comprising: passing high pressure steam in indirect heat exchange with a material to be heated, collecting a condensate product condensed from the steam of the heat exchange operation at an elevated pressure, passing the condensate directly to a steam stripping operation at essentially the same pressure at which the condensate was collected, and thereafter reducing the pressure of the condensate while simultaneously contacting the condensate with a multicomponent material to be stripped in the steam stripping operation. Where the water from the stripping operation is relatively pure, the resultant water may be utilized to supply at least a part of the water necessary for other industrial operations.

BRIEF DESCRIPTION OF THE DRAWINGS

FIG. 2 is a flow diagram of one embodiment of a steam stripping operation in accordance with the present invention.

FIG. 3 is a flow diagram of a water utilization operation in accordance with the present invention.

DESCRIPTION OF THE PREFERRED EMBODIMENTS

Figure 1:
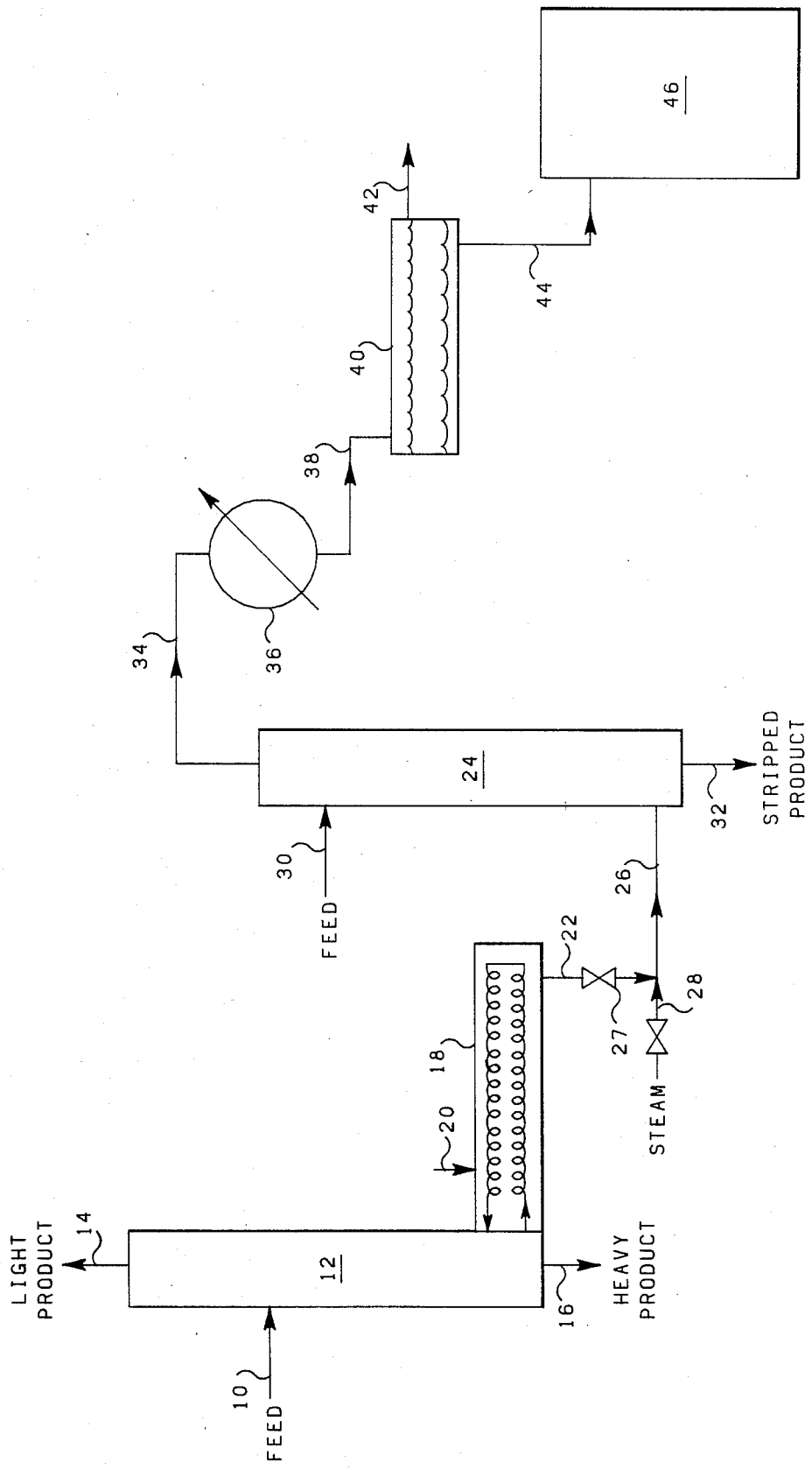
FIG. 1 of the drawings is an overall schematic flow diagram illustrating one embodiment of a process of the present invention.

As previously indicated, numerous industrial processes for the separation of multicomponent streams utilize steam as a heating medium for separating the feed stream into its constituent components. For example, various evaporator operations utilize steam at relatively high pressures as a heating medium in indirect heat exchange with the multicomponent stream to be separated. Similarly, in fractionation columns steam is utilized as a heating medium in the reboiler of such a column. For example, a portion of the multi-component feed material is withdrawn from the bottom of the fractionation column, passed through a coil in the reboiler and then returned to the fractionation column at a higher point adjacent the bottom of the fractionation column. Steam at elevated pressure, for example, about 150 psig, is introduced into the shell of the reboiler and a high pressure condensate, at essentially the same pressure as the steam, which condenses from the steam in the reboiler, is withdrawn from the reboiler. Obviously, such high pressure steam condensates possess substantial amounts of energy in the form of heat and pressure and, to the extent that the condensate is simply disposed of, passed to a flash drum and then disposed of or is flashed and the water at essentially ambient pressure and temperature is utilized in other operations, there is a very significant waste of such energy.

Therefore, in accordance with the present invention, the energy of high pressure steam condensate is effectively utilized in other industrial operations. In accordance with one embodiment of the present invention, the high pressure steam condensate, without significant reduction in pressure other than the reduction which results from transmitting the condensate through a suitable conduit or the like, is utilized in other operations which require steam at relatively low pressures or at ambient pressures. For example, in various industrial operations, multicomponent streams of materials are stripped to remove one or more desirable or undesirable components therefrom. In most cases steam is utilized, at relatively low pressures, as the stripping medium. Examples of such steam stripping operations are found in a wide variety of refinery operations. Accordingly, in one aspect of the present invention, high pressure steam condensate is utilized in the steam stripping of various multicomponent material streams in refining operations. For example, crude oil treating techniques as well as techniques for treating refinery product streams for the removal of sulfur produce "sour water" streams, containing hydrogen sulfide which is later steam stripped from the sour water. In the separation of multicomponent streams with an absorption oil, steam is utilized to strip light hydrocarbons from rich absorption oil. When a sour water stream is steam stripped, for example with steam at a pressure of about 7 psig, the hydrogen sulfide is withdrawn as a gas overhead and sent to sulfur recovery. In accordance with the present invention, in such an operation, steam condensate at essentially its original pressure is passed to the sour water stripper, either to the sour water sump which feeds the stripper or directly to the stripper tower, and the pressure thereof is reduced to essentially the pressure of the stripper. In any event, the condensate is flashed, thereby supplying at least a part of the stripping steam necessary for the operation of the stripper column. In fact, the condensate recovered from a typical reboiler can supply all of the stripping steam necessary for the operation of a typical sour water stripper. While this type of operation represents a preferred embodiment of the present invention, there are numerous other processes, particularly in the refining industry, where low pressure stripping steam can be utilized and consequently where the high pressure condensate may be utilized to supply at least a part of the heat, pressure and/or steam necessary for the stripping operation. Additional examples include the following. In the processing of unfinished naphtha for the removal of polymeric materials to produce light and heavy naphthas for gasoline blending, the unfinished naphtha can be steam stripped in a still to remove water and light naphtha as an overhead product which is thereafter phase separated to separate the naphtha from the water. Also, in various solvent refining treatments of products such as gasoline, crude fractions and the like, various product streams are steam stripped. For example, when a caustic-methanol treatment is utilized to produce finished gasoline from a raw naphtha product, steam stripping is utilized both to regenerate the caustic and to recover the methanol for recycle. In the latter instance, a clarified water stream condensed from the steam is recovered as bottoms product. In nitrobenzene solvent extraction, steam is utilized to strip a paraffinic product as well as a naphthenic product. In a phenol solvent extraction process, steam is utilized to strip the extract and the raffinate phases. In addition to these generic processes, in the dewaxing of oil with methylethyl ketone, steam stripping is utilized to strip solvent from the slack wax and the dewaxed oil. Also, in the treatment of certain wax products wherein the waxes are deoiled with methylethyl ketone as a solvent, steam stripping is utilized to strip the wax product as well as the separated oil. In the deasphalting of crude residues, utilizing a solvent such as propane, steam stripping is utilized to strip the deasphalted oil as well as a heavier residue product. There are numerous other refinery processes which utilize steam stripping for one purpose or another. The number and variety of uses of steam stripping in industrial operations in general are myriad but those skilled in the art will readily recognize such processes wherein the present invention may be employed.

Where the water is recovered at some stage in a steam stripping operation, the water recovered from the steam stripping operation can then be gainfully utilized for other purposes in accordance with the present invention. The water thus recovered has distinct advantages even though in some cases it may contain residual amounts of chemicals or oil. Specifically, since the material is originally a steam condensate, the water will be low in minerals and thus have a significantly reduced tendency to build up scale in other equipment or to foul equipment in which it is later used. This is particularly true of the water recovered from a sour water steam stripping operation where both the water from the sour water feed and the condensate from the steam are recovered and can be utilized in operations where water of low mineral content is desired. For example, the recovered water may be utilized in cooling towers, as feed water for boilers and in similar operations. A particularly advantageous use of the recovered water, in a refining operation, involves its use as at least a part of the water necessary for a crude oil desalting operation. Such an operation involves mixing a heated crude oil with soda ash and water, thereafter settling in one or more stages, preferably three stages, to remove desalted crude oil as an overhead product and spent soda ash solution as bottoms product. Usually the spent soda ash from the settling tanks is passed in indirect heat exchange with the water feed to the desalting operation. The utilization of the recovered low pressure condensate, as from a steam stripping operation, has a further distinct advantage in this use in that the water is still at an elevated temperature and thus the heat energy of the recovered condensate is utilized to reduce the energy necessary to heat the feed materials to the desalting operation.

The present invention will be further illustrated by reference to the drawings, which show certain of the preferred embodiments of the present invention.

FIG. 1 of the drawings is a simplified flow diagram of one embodiment of the overall method of the present invention. In FIG. 1, a multicomponent feed material is introduced to the system through line 10. The multicomponent feed is separated in unit 12, which may be a fractionator or other appropriate separating means, a light product is discharged as an overhead through line 14 and a heavy product is withdrawn from the bottom of the fractionating column through line 16. In order to maintain the appropriate temperature at the bottom of column 12, column 12 is provided with reboiler 18. Reboiler 18 is supplied with high pressure steam, for example at about 150 psig, through line 20 and a condensate product representing the condensed steam is discharged from reboiler 18 through line 22. The material at the bottom of column 12 is thus heated by passing a portion of the bottoms product through reboiler 18 and back to column 12 at a point higher than the point of withdrawal but still adjacent the bottom of the column.

The condensate collected passing through line 22, is then passed to a stripping still 24 through line 26. An expansion or letdown valve 27, in line 22 reduces the condensate pressure, for example to about 7 psig, to thus supply at least part of, and in many cases all of, the stripping steam necessary for the operation of the stripping column 24. To the extent that additional stripping steam is necessary such make-up steam can be provided through line 28. The feed to stripping column 24 is introduced adjacent the top of the column through line 30. The stripped product of stripping column 24 is discharged as a bottoms product through line 32. The steam together with the material being stripped from the feed material is discharged as an overhead through line 34. From line 34 the overhead of stripping column 24 is passed through a cooler or condenser 36 and thence through line 38 to a settler or separator 40. In the settler or separator condensed water is separated from the stripped material. The stripped material is then discharged through line 42 while the condensed water is discharged through line 44. The condensed water is then passed through line 44 to a water utilization system 46.

FIG. 2 of the drawings shows a specific example of a preferred stripping operation in accordance with the present invention. In FIG. 2, the stripping operation involves the removal of hydrogen sulfide from a sour water stream. This sour water stream may be obtained from one of a variety of sources in the refinery but usually will be a byproduct of the removal of hydrogen sulfide from a crude oil. However, it is obvious that the removal of hydrogen sulfide from various crude product streams also produces significant amounts of sour water. Sour water is introduced into the system through line 48 to a sump or collection tank 50. Sour water from sour water sump 50 is passed through line 52 to a steam stripping column 54. The steam for stripping is supplied by the condensate from a reboiler or the like referred to in FIG. 1. This high pressure condensate may be passed to sour water sump 50 through line 56 or, preferably, directly to stripping column 54 through line 58. As previously indicated, it is particularly advantageous to pass the high pressure condensate through line 58 to stripping column 54 and flash the condensate through an expansion valve 59 directly into the stripping column, for example, by reducing the pressure to about 7 psig. In this mode of operation, the condensate is capable of supplying all of the stripping steam necessary. However, in some instances it may be desirable to introduce additional steam through line 60. It is of course also necessary to supply steam through line 60 if the condensate is all introduced to sump 50 through line 56. The hydrogen sulfide stripped from the sour water in column 54 is discharged as a vapor phase through line 62 and is preferably passed to a sulfur recovery system (not shown). Stripped product, in this case water, and recovered condensate are withdrawn as a bottoms product through line 64. The stripping illustration in FIG. 1 differs only to the extent that the feed to the stripping column is a multicomponent, non-aqueous system, for example an oil or refinery product which is to be stripped of residual solvent from a solvent refining operation. In this case, the stripped product would be the oil which would be discharged through line 32 and the overhead product would be the solvent and the steam, which is discharged through line 34.

FIG. 3 of the drawings illustrates, in schematic form, one embodiment of a water utilization operation for utilizing the water recovered from a steam stripping operation. Specifically, FIG. 3 illustrates the utilization of the water from a steam stripping operation as at least a part of the water necessary for a crude oil desalting operation. Many crude oils charged to a refinery contain varying quantities of inorganic salts, often as much as 200 pounds per thousand barrels of oil. In order to prevent such salts from depositing on heating surfaces and fouling the same during subsequent refining operations, these salts are generally removed by the desalting operation prior to further separation or treatment of the crude. Specifically, crude is fed to the desalting operation through line 66 to an appropriate pump 68. Pump 68 discharges the crude through line 70 to a heater 72. The heated crude passes through line 74 from heater 72. A water supply, in the present case the water recovered from a steam stripping operation, is introduced into the system through line 44 (FIG. 1) or line 64 (FIG. 2) to a heat exchange unit 76. From heat unit exchange 76 the water passes through lines 78 and 80 and is mixed with the crude from line 74. A treating agent, in this case soda ash, is introduced into the system through line 82 and is mixed with the water. The crude, soda ash and water then pass through line 84 to mixing valve 86 and thence to a first settling tank 88. Spent soda ash-water solution is discharged as a bottoms product from line 90. The crude plus some water is discharged as an overhead product through line 92 and is fed to a second settling tank 94. Spent soda ash-water solution is discharged from tank 94 through line 96 while the crude plus some water is discharged through line 98 to a third settling tank 100. From settling tank 100, desalted crude is discharged through line 102 while spent soda ash-water solution is discharged through line 104. The spent soda ash-water solution from lines 90, 96 and 104 is normally combined and discharged through line 106 to heat exchanger 76 to supply some of the heat necessary for heating the feed water.

By way of specific example, a refinery condensate from a reboiler was sent to the sour water sump of a sour water stripping operation. As a result of this utilization of the energy of the high pressure condensate it was estimated that savings to the refinery from the use of the invention would approximate about $49,000.00 per year. Still greater savings can be attained by passing the high pressure condensate directly to the stripping column as a substitute for at least part of the steam.

While specific processes and apparatus have been referred to herein for illustrative purposes it is to be understood that such specific illustrations are not to be considered limiting and numerous modifications thereof and alternatives will be apparent to one skilled in the art without departing from the present invention.

What is claimed is:

1. A method of utilizing the energy of high pressure steam, comprising:
   (a) passing said high-pressure steam, at an elevated pressure of at least about 150 psig, in indirect heat exchange with a first feed material, to be heated in a heat exchange operation, under conditions to produce a high-pressure condensate stream, having a pressure of essentially said elevated pressure, from the condensation of said high pressure steam;
   (b) reducing the pressure of said high-pressure condensate to a pressure sufficient to produce a low-pressure steam, having a pressure of about 7 psig;
   (c) directly contacting a multicomponent second feed material, other than the thus heated first feed material, with the thus produced low-pressure steam, in at least one steam stripping operation, to strip at least one component from said multicomponent second feed material;
   (d) condensing said low-pressure steam to produce an at least partially purified water stream, including the thus condensed low-pressure steam; and
   (e) passing said at least partially purified water stream directly to a water utilization operation, as at least part of the water requirement thereof.

2. A method in accordance with claim 1 wherein the indirect heat exchange operation is a reboiling of the first feed material to be heated.

3. A method in accordance with claim 1 wherein the pressure of the high-pressure condensate in thus reduced by passing the same through a reducing valve means.

4. A method in accordance with claim 1 wherein the multicomponent second feed material is a sour water and the at least one component, thus stripped from said sour water, is hydrogen sulfide.

5. A method in accordance with claim 4 wherein the low-pressure steam is passed directly to the steam stripping operation as at least part of the steam requirement of said steam stripping operation.

6. A method in accordance with claim 4 wherein a sour water sump provides the sour water feed to the steam stripping operation and the low-pressure steam is passed to said sour water sump.

7. A method in accordance with claim 4 wherein the at least partially purified water stream includes the thus condensed low-pressure steam and the water component of the sour water feed.

8. A method in accordance with claim 7 wherein the water utilization operation is a crude oil desalting operation and the at least partially purified water stream is at least part of the water requirement of an aqueous soda ash solution utilized in said crude oil desalting operation.

9. A method in accordance with claim 7 wherein the water utilization operation is a steam generating operation carried out in a boiler means and the at least partially purified water stream is at least part of the feed water requirement of said steam generating operation.

10. A method in accordance with claim 7 wherein the water utilization opeation is a water cooling operation carried out in a cooling tower means and the at least partially purified water stream is at least part of the water requirement of said water cooling operation.

11. A method in accordance with claim 1 wherein the water utilization operation is a crude oil desalting operation and the at least partially purified water stream is at least part of the water requirement of an aqueous soda ash solution utilized in said crude oil desalting operation.

12. A method in accordance with claim 1 wherein the water utilization operation is a steam generating operation carried out in a boiler means and the partially purified water stream is at least part of the feed water requirement of said steam generating operation.

13. A method in accordance with claim 1 wherein the water utilization operation is a water cooling operation carried out in a cooling tower means and the at least partially purified water stream is at least part of the water requirement of said cooling water operation.

* * * * *